Patented Sept. 2, 1952

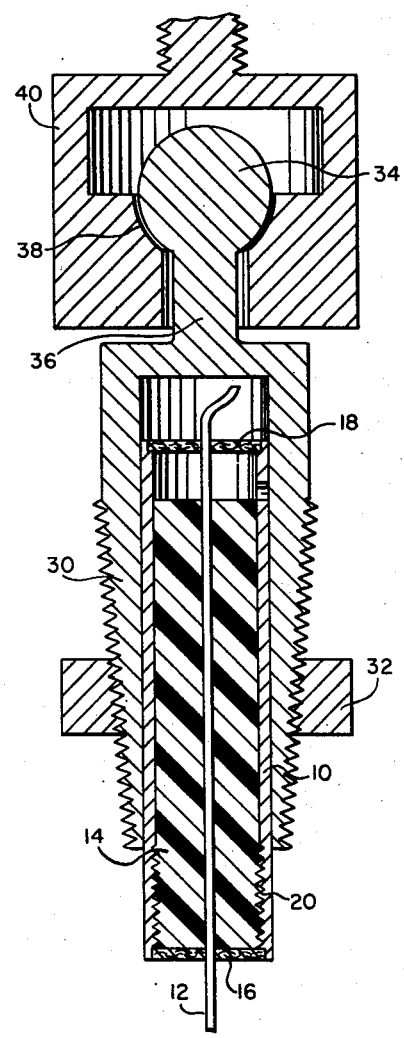

2,608,857

UNITED STATES PATENT OFFICE 2,608,857

MOUNT FOR TENSILE TESTING SPECIMENS OF TEXTILE MATERIAL

Richard R. La Torre and Thomas W. George, Washington, D. C.

Application August 12, 1949, Serial No. 110,012

4 Claims. (Cl. 73—103)

(Granted under the act of March 3, 1883, as amended April 30, 1928; 370 O. G. 757)

This invention relates to the mounting of specimens of textile materials for tensile testing and particularly to a mounting wherein certain special geometrical relationships are maintained between the specimen, the specimen holder or head, and direction of tensile stress.

It is the primary object of this invention to provide a mounting head which will permit mounting of tensile test specimens of textile filaments, yarns, threads, or sheets in a geometrical relation to such head so as to eliminate undesirable stress variables.

It is a further object of the invention to provide means for mounting such tensile specimens which will leave them free of stress concentration and deformation.

It is another object of the invention to provide a mounting head which will deform to accommodate the specimen but will not let it slip at loads below its breaking load.

It is still another object of the invention to provide mounting wherein the mounting head can be placed anywhere along the length of a specimen rather than at an end only.

It is yet another object to provide a rapidly, mass-produceable mounting for tensile testing specimens of textile materials.

Other objects and advantages will be apparent from the following description of the invention.

The term "strand" is used throughout this specification as generic to the single, unitary (short) fibers and (long) filaments and the multi-unit, twisted yarns and threads.

The conventional methods of mounting specimens of textile materials such as filaments, yarns, threads or sheets for tensile testing involve either some sort of clamping action such as with a fixed jaw and a cam-operated moveable jaw, or a winding of the specimen about a post means. While such devices hold the specimen for tension satisfactorily, it is clear that they create complex stress patterns in the specimen and at least some deformation of the specimen itself.

It has been found that the "scattering" of tensile test values which occurs in repeated testing of identical materials under what appear to be identical conditions is in a large part due to complex and indeterminate stress relations set up by factors inherent in the conventional methods of mounting the specimens. These stress relations are operative to affect the tensile values even though the break occurs at a point remote from the mounting, i. e. near the middle of the specimen. It is apparent therefore that in order to raise the reproducibility of results of the tensile testing of textile specimens it is necessary to provide a mount for testing specimens wherein these complex stress relations would be substantially eliminated, and that this would involve disposing the mounted portion of the specimen in the simplest possible geometrical relation with the direction of stress application, and preferably with the mount itself. Ideally, the specimen would be "mounted" by merely suspending it in thin air, and this invention is designed to approximate that condition as closely as is physically possible.

Accordingly, this invention comprises a mounting head for the tensile testing of specimens of textile material wherein all parts of the specimen under stress are maintained in precise axial alignment with the direction of stress application. It follows from the foregoing that the cross-sectional configuration of the specimen must approach as nearly as possible absolute uniformity.

It has been found that with the mounting head of this invention the "scatter" of tensile test results may be reduced 25-40% below that occurring under comparable conditions with conventional heads.

The preferred embodiment of this invention comprises a mount for the testing of strands consisting of a tubular sheath element in which the specimen is suspended axially and is held in place under tension by the binding action of a surrounding filler material brought about by the solidification or hardening of same. Reference to the accompanying drawing which is a cross-section view of a typical testing assembly contemplated by this invention will more clearly illustrate the nature of the invention.

In this drawing the specimen mount is shown held in place in a preferred type of gripping means. This gripping means is designed to permit perfect alignment of that part of the specimen which is held in the mount with the direction of load application.

Thus, the tube 10 is held in split chuck means 30 which is tightened by turning internally tapered and threaded nut 32 along the externally tapered and threaded surface of said chuck means. The chuck means 30 is made integral with ball 34 through bar 36 connecting its base therewith. Ball 34 forms a universal joint with socket 38 which is formed in the interior of cylinder 40. Cylinder 40 is adapted to be rigidly mounted in the tensile testing machine. It will be understood that other conventional types of universal joint means can be substituted for the ball-and-socket arrangement, as well as other types of gripping means for the split chuck devices.

The mount, or head, of course, is first prepared as described below and then placed in the machine as shown. The tube 10 is shown with an axially suspended strand specimen 12 which is mounted for tensile testing. Cast thermoplastic material 14 fills the major portion of the tube and surrounds the suspended strand. A disk 16 of cardboard or other suitable material having a small central hole therein to permit passage of the strand is secured to the bottom end of the tube to hold the specimen in alignment, and to seal off the flow of plastic during the fabrication of the head. At the other (top) end of the tube a strip 18 of material such as cardboard with a central hole therein is also disposed to align the specimen. It is important that the specimen be aligned substantially parallel to, and preferably coincident with, the axis of the tube. It should be tensioned somewhat during introduction of the filler. Also no part of the specimen under stress should be frayed or deformed from uniform cross-section as this will cause erratic tensile values. The molten plastic is introduced into the tube through the open upper end, e. g. by funnel means.

The tube must be hard and rigid enough to be held tightly in the grips of a tensile testing machine without appreciable radial deformation. The requisite properties of the tube will, of course, depend on the ultimate load to be applied to the specimen. If to be used in mounting specimens having a breaking strength of more than a few pounds it should be machinable, or in some way adaptable to the formation of a serrated internal surface (as shown at 20) so that the body of solidified plastic will not slip out of the tube, the plastic-to-tube material bond being relatively weak. It will be understood that in carrying out tensile tests this assembly shown in the drawing will be adopted to both ends of the specimen.

The dimensions of the tube, as well as its composition, and also the nature of the plastic filler may vary greatly depending on the ultimate load which will be applied to the specimen. This, of course, will be a function of the specimen itself, i. e. its composition, cross-sectional area, and whether it is a single filament or twisted into yarn or thread or is a sheet specimen. Thus, tiny "nylon" filaments (0.001 in. diameter) having a breaking strength in the order of 2 ounces have been tested by mounting them in a "tube" of polystyrene formed by drilling a hole 0.007 in. in diameter in a block of polystyrene and forcing an acetone-soluble pyroxylin-base cement (Duco cement) into the hole with a hypodermic needle. It may be pointed out that it would probably not even be possible to hold a specimen of this size with conventional mounting means. On the other hand, specimens having a breaking strength in the order of 25 pounds have been tested in a mount made with an aluminum tube about 3 inches long and ½ inch in diameter. A plastic filler of cellulose caprate, prepared as described below, was used in these latter tests.

The upper limit of tensile strengths which may be determined using this invention is fixed by the "unit shear strength" of the plastic-to-specimen bond plus the practical length of the tube. It has been found that by the use of cellulose caprate melted at about 130°–150° for from 15 to 30 minutes before casting, and poured into the tube at that temperature makes a very excellent bonding filler. In fact, cellulose caprate has been found to have much greater "shear strength" with a variety of textile materials than a large number of other plastics tested and it is the preferred filler in testing relatively high-strength specimens. It loses this bonding property rapidly, however, if allowed to darken during the melting process, or if poured too hot or too cold.

Of course higher strength materials can be so mounted and tested by using a longer tube, but this involves greater difficulty of alignment, probability of fraying, etc. and the point of diminishing returns is soon reached. The diameter of the tube (or more accurately the ratio of tube diameter to specimen diameter) undoubtedly plays a role in determining the load that the mount will support. We have found empirically that this ratio should be at least 5 to 1. The requisite length of the sheath (or more accurately the length of the portion of the specimen which is imbedded in the plastic) to sustain a given load will depend on the "shear strength" of the bond, as indicated above. This is not a true shear strength in the strict sense and can probably not be calculated accurately even for a given combination of strand material and plastic. It has been found however, that with cellulose caprate the mount will hold any strand at its breaking load if the length of the "bond" is about 100 times the diameter of the specimen.

It may be pointed out that while the tube means will ordinarily be of circular cross-section when testing strand specimens this is not critical, and elliptical cross-section tube means would work just as well. Various geometries may be desirable for use in different types of testing machines or gripping devices. Of course for the testing of sheet specimens to which this invention is also adaptable, the holder will comprise a rectangular sheath with length determined by the width of the specimen, and thickness at least five times thickness of the specimen. The height of the rectangle would be determined by the "shear strength" consideration mentioned above preferably being about 100 times the specimen thickness.

The tensile testing of textile sheet specimens is not as common as that of strand specimens, but the difficulties of complex stress-pattern formation are even greater than with strand specimens. Thus, it is believed that with the use of this invention, tensile testing of sheet specimens may become more common.

The most critical factor of this invention is the geometrical relation of the entire portion of the specimen under stress to the direction of stress application, i. e. they must be coaxial. This is most easily achieved by aligning the axis of the specimens with the axis of the tube in the mounting process and then in the actual testing, allowing the tube to align itself with the direction of applied stress or load. It will be apparent that the critical conditions can be maintained even if the specimen is not absolutely parallel to the tube provided the tube is gripped similarly to the manner shown.

The foregoing examples are intended to be illustrative only, and it will be apparent to those skilled in the art that many modifications thereof may be made without departing from the scope and spirit of the invention which is to be limited only by the herewith appended claims.

The invention described herein may be manufactured and used by or for the Government of the United States of America for governmental purposes without the payment of any royalties thereon or therefor.

What is claimed is:

1. A mount for supporting under tension a sheet or strand specimen of textile material comprising, a longitudinal metal sheath means having at least a partially serrated internal surface and disposed substantially concentrically about a slightly tensioned, uniform cross-section portion of said specimen, the inside width of said sheath means being at least five times the thickness of said specimen and said sheath means having fixedly disposed therein cast, solidified cellulose caprate surrounding and adhering to the said portion of said specimen along a length thereof in the direction opposite to that of stress application at least 100 times its thickness.

2. A mount for supporting under tension a strand specimen of textile material comprising, a longitudinal metal tube having at least a partially serrated internal surface and disposed substantially concentrically about a slightly tensioned, uniform cross-section portion of said specimen, the inside diameter of said tube being at least five times that of said specimen and said tube having fixedly disposed therein cast, solidified cellulose caprate surrounding and adhering to the said portion of said specimen along a length thereof at least 100 times its diameter.

3. A mount for supporting in tension a filament specimen of a textile material having a diameter in the order of 0.001 inch comprising a block of polystyrene having therein an aperture approximately 0.007 inch in diameter, and being at least one-half inch long, said block being disposed with said aperture substantially concentric about said specimen, and a quantity of hardened acetone-soluble pyroxylin-base cement fixedly disposed in said aperture and surrounding and adhering to said filament along a length thereof of approximately one-half inch.

4. Apparatus for applying tensile stress to a strand of textile material in a direction coaxial with every portion of the specimen under stress comprising: a mount comprising a tube means disposed substantially concentrically about a slightly tensioned portion of said specimen, said tube means having an inside diameter at least five times the diameter of said specimen and having a quantity of cellulose caprate cast therein surrounding and adhering to said specimen along a length thereof at least 100 times its diameter; and a gripping means adapted to receive said mount and grip same radially; and universal joint means for joining said gripping means with a grip of a tensile testing machine.

RICHARD R. LA TORRE.
THOMAS W. GEORGE.

REFERENCES CITED

The following references are of record in the file of this patent:

UNITED STATES PATENTS

| Number | Name | Date |
|---|---|---|
| 1,723,816 | Scott | Aug. 6, 1929 |
| 1,870,661 | Vogt | Aug. 9, 1932 |
| 1,984,477 | Hagedorn | Dec. 18, 1934 |
| 2,109,171 | Gould | Feb. 22, 1938 |
| 2,235,622 | Ray | Mar. 18, 1941 |
| 2,274,823 | Candy | Mar. 3, 1942 |
| 2,400,920 | Cummings | May 28, 1946 |